Patented Dec. 31, 1946

2,413,463

UNITED STATES PATENT OFFICE 2,413,463

METHOD FOR PREPARING SOLUBLE ALLYL STARCH

Peter L. Nichols, Jr., Philadelphia, Philip E. Meiss, Fort Washington, and Elias Yanovsky, Philadelphia, Pa., assignors to the United States of America as represented by the Secretary of Agriculture No Drawing. Application April 20, 1944, Serial No. 531,971

8 Claims. (Cl. 260—209)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the preparation of soluble allyl starch, and has among its objects the provision of an improved method of preparing soluble allyl starch.

We have found that organic solvent soluble allyl starch can be readily obtained if rapid oxidation and/or polymerization of the allyl starch formed during the allylation reaction is prevented. Organic solvent soluble allyl starch if left exposed to air will, after a period of time, become coated with an insoluble layer. On the other hand, if the soluble allyl starch is dissolved in acetone, it will keep for a long time without change in its properties. It can be precipitated from the acetone solution by water and the original product is obtained. In the application for patent of Robert M. Hamilton and Peter L. Nichols, Jr., Serial No. 518,976, filed January 20, 1944, a new method of preparing allyl starch is described which yields a product soluble in a great many organic solvents. The success in obtaining organic solvent soluble allyl starch by the method described in that application is due in part to the fact that the allyl starch formed is immediately dissolved in acetone present in the reaction mixture. The disadvantage of this method is that it requires a two-step process; namely, preparation of the acetate of the carbohydrate followed by hydrolysis and allylation of the acetate. We have found that starch can be allylated directly, provided strong alkali is used and an organic solvent for allyl starch is present in the reaction. This solvent can be acetone, ethyl methyl ketone, benzene or any other organic solvent for allyl ether of starch. The starch can be any native starch, such as corn starch, potato starch, wheat starch, and so forth, or a modified starch, such as thin boiling starches, dextrines, and oxidized starches.

The examples given below illustrate reaction mixtures which can be used in the preparation of allyl starch ether by this method.

Example I

| | | |
|---|---|---|
| Water | cc | 67 |
| Sodium hydroxide | g | 100 |
| Starch | g | 50 |
| Acetone | cc | 250 |
| Allyl bromide | g | 300 |

This mixture was refluxed on hot water bath for 8 hours. The resulting product had about 1.5 allyl groups per glucose unit.

Example II

| | | |
|---|---|---|
| Water | cc | 67 |
| Sodium hydroxide | g | 100 |
| Starch | g | 50 |
| Methylethyl ketone | cc | 250 |
| Allyl bromide | g | 300 |

This mixture was refluxed on hot water bath for 10 hours. The resulting product had about 2.2 allyl groups per glucose unit.

Example III

| | | |
|---|---|---|
| Water | cc | 26 |
| Sodium hydroxide | g | 40 |
| Potato dextrin | g | 20 |
| Methylethyl ketone | cc | 100 |
| Allyl bromide | g | 120 |

This mixture was refluxed on hot water bath for 5 hours. The resulting product had about 2.1 allyl groups per glucose unit.

Example IV

| | | |
|---|---|---|
| Water | cc | 61 |
| Sodium hydroxide | g | 100 |
| Thin-boiling starch | g | 56 |
| Methylethyl ketone | cc | 250 |
| Allyl bromide | g | 300 |

This mixture was refluxed on hot water bath for 5 hours. The resulting product had about 1.5 allyl groups per glucose unit.

Example V

| | | |
|---|---|---|
| Water | cc | 52 |
| Sodium hydroxide | g | 80 |
| Starch | g | 40 |
| Acetone | cc | 100 |
| Allyl chloride | cc | 82 |

This mixture was heated in autoclave at 85° C.

for six hours. The resulting product had about 1.5 allyl groups per glucose unit.

All of the products obtained above were soluble in acetone and various other organic solvents. With each of them, 30 to 50 percent solutions could be readily prepared. Also, by varying the time or temperature of the reaction, and the relative amounts of starch and allyl halide used, products of various degree of solubility and of various degress of viscosity could be obtained.

The various ingredients of the reaction mixture can be mixed in several ways. It is sometimes preferable to make alkali starch (a solution of starch in alkali which is allowed to set to a solid) in a separate container, and then put it in the reaction flask and add the other reagents. The alkali starch can also be prepared in the reaction flask, followed by addition of the other reagents. A third alternative is to mix all of the reagents simultaneously, in which case, however, a stouter stirrer is required. After the reaction is over, the mixture is poured into a large volume of water and the separated allyl starch is washed until free from alkali. Or, the mixture is poured into water and steam distilled, the excess of allyl halide and the acetone is recovered, and the separated allyl starch is then thoroughly washed until free from alkali. Allyl starch is obtained either as powder or a gummy mass.

Having thus described our invention, we claim:

1. The process of preparing organic solvent soluble allyl starch which comprises allylating starch in the presence of concentrated alkaline solution and an organic solvent for the allyl starch.

2. The process of preparing organic solvent soluble allyl starch which comprises allylating starch with an allyl halide in the presence of concentrated alkaline solution and an organic solvent for the allyl starch.

3. The process of preparing organic solvent soluble allyl starch which comprises allylating starch with allyl bromide in the presence of concentrated sodium hydroxide solution and an organic solvent for the allyl starch.

4. The process of preparing organic solvent soluble allyl starch which comprises allylating starch with allyl chloride in the presence of concentrated sodium hydroxide solution and an organic solvent for the allyl starch.

5. The process of preparing allyl starch which comprises allylating starch in the presence of concentrated alkaline solution and a lower alkyl ketone.

6. The process of preparing allyl starch which comprises allylating starch with an allyl halide in the presence of concentrated alkaline solution and a lower alkyl ketone.

7. The process of preparing allyl starch which comprises allylating starch with allyl bromide in the presence of concentrated sodium hydroxide solution and a lower alkyl ketone.

8. The process of preparing allyl starch which comprises allylating starch with allyl chloride in the presence of concentrated sodium hydroxide solution and a lower alkyl ketone.

PETER L. NICHOLS, JR.
PHILIP E. MEISS.
ELIAS YANOVSKY.